Sept. 12, 1933.  E. GERNERT  1,926,989
ELECTRIC IRON APPLIANCE
Filed March 16, 1932
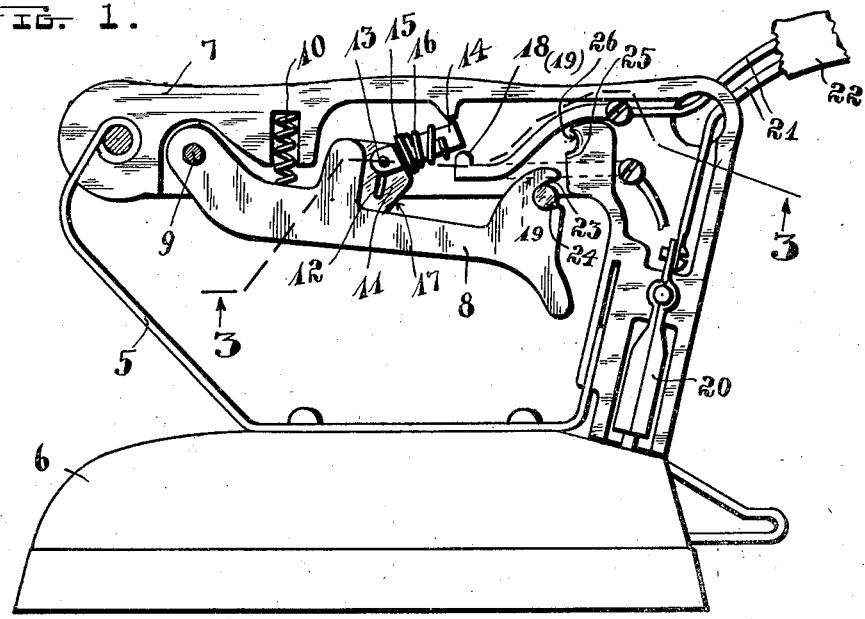
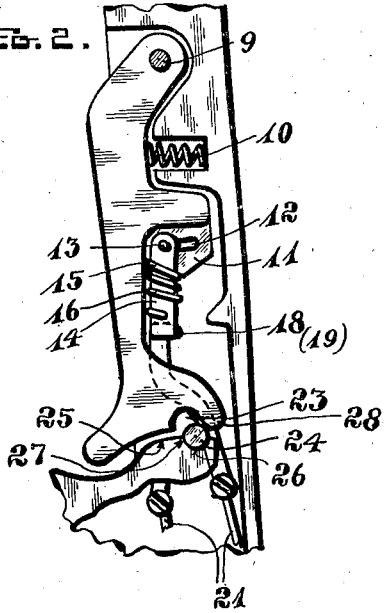
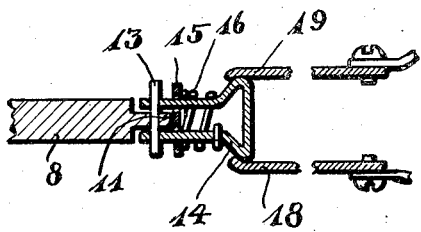
INVENTOR:
EARLE GERNERT,
By: Otto J. Kunz,
his Atty.

Patented Sept. 12, 1933

1,926,989

UNITED STATES PATENT OFFICE

1,926,989

ELECTRIC IRON APPLIANCE

Earle Gernert, Phoenix, Ariz.

Application March 16, 1932. Serial No. 599,103

2 Claims. (Cl. 200—157)

This invention relates to devices used on electric flat irons for controlling the electric current.

One of the objects of this invention is to provide mechanisms for manually controlling the current while handling the iron in its customary use.

Another object is to provide means whereby such mechanisms automatically maintain the electric current turned off when the iron is left standing on its flat ironing surface, while automatically maintaining the current turned on when the iron is left standing on end.

Another object is to provide means whereby the current can be controlled by a mere tightening of the operator's hand around the handle of the iron while the current will automatically shut off when the handle is released as long as the iron is disposed in its normal ironing position with its flat surface down.

Other objects will appear from the following description and appended claims as well as from the accompanying drawing, in which—

Fig. 1 is a vertical midsectional view of a handle of an electric iron with the current controlling mechanisms in shut off position.

Fig. 2 illustrates the mechanisms in contact-making position which they automatically retain when the iron is placed on end with the handle of the electric iron in a practically vertical position.

Fig. 3 is a fragmentary section on line 3—3 of Fig. 1 of cooperating parts involved in holding the mechanisms in contact-making position.

As illustrated in the drawing, a bracket 5 is attached to the top of the electric iron 6 in the customary manner, to support the handle 7.

The handle in this case, however, is designed and arranged to hold the current-controlling mechanisms, the principal hand-actuated lever 8 being pivotally connected to the handle 7 as indicated at 9.

In the upright position, in which the electric iron is customarily handled over the ironing board and in which it is illustrated in Fig. 1, gravity alone is sufficient to bring the hand-actuated lever 8 to its lowermost position but a spring 10 is inserted to assure such positioning under all conditions as will be described later on.

A cam 11 on the lever 8 is provided with a slot 12 by which the up and down movements of the lever are limited, the pin 13 being inserted through this slot and being stationary with the handle serving to abut against the end walls of the slot and thereby holding the lever in its upper- and lowermost positions, or its contact-making and contact-breaking positions.

The pin 13 serves also to pivotally support the contact-pawl or switch 14, the washer 15, under the tension of the spring 16 riding on the cam-edge 17, thereby holding the switch in either the contact-making or contact-breaking position, the contact-breaking position being illustrated in Fig. 1 and the contact-making position being illustrated in Fig. 2.

In the fragmentary illustration of Fig. 3, the cooperative relation between contacting parts is made more clear, the pawl or switch 14 being made of current-conducting material to bridge the gap between the terminal members 18 and 19 in contact-making position.

The terminal members 18 and 19 serve as connecting means for the wires or leads 21 of a cable 22 applied to an electric iron by way of the plugs 20 in the lower end of the rear portion of the handle 7 whereby the electric current is brought to the heating elements in the iron 6 in the customary manner, not further detailed in the drawing since so well known.

The tension of the spring 10 is preferably sufficiently strong to overcome any counteracting feature in the spring 16 of the switch 14 so that the weight of the lever 8 can form the overbalancing means for the switch while riding on and over the cam-edge 17.

For holding the switch in contact-making position by means of the hand-actuated lever 8, the rear-end of the lever is provided with a suitable cut-out 23 to receive and hold a locking roller 24, and the rear inner wall 25, formed in the hollowed out handle 7, is provided with a cooperating recess 26, into which the roller 24 may drop when the iron is placed on end so as to bring the lever 8 to a practically vertical position, in which this lever is illustrated in Fig. 2.

In this position, the roller 24 wedges itself between the shoulder 27 of the recess 26 in the handle-wall 25, on the one side, and the outermost projecting extension-end 28 on the lever 8 on the other side, overreaching or overlapping the roller in this locking position, thereby locking the lever 8 and therewith the switch 14 in contact-making position.

It must, however, be realized that the lever 8 is first moved into this position manually before or while the iron is so placed on end; or that, otherwise, the iron can also be placed on end with the lever and therewith the switch in contact-breaking position, since the spring 10 will easily hold the lever with the switch in contact-breaking position whether the iron is placed on end or left standing flat on its ironing surface.

This arrangement has the advantage that the iron can be heated, or reheated, or the temperature of the iron can be increased after it has been used for such a period that the iron has become too cold to be efficient any longer, by merely placing the iron on end with the lever 8 and the switch in contact-making position; while the placing of the iron on its flat surface leaves the iron automatically in contact-breaking position so that its heat will not be increased if left by mistake with its ironing surface on any cloth.

In both positions, all danger or fire-hazard is eliminated.

On the other hand, the operator is enabled to increase the heat at will at any moment while using the iron in the normal manner without any plugging in or out or without operating any cumbersome switches, but merely by a tightening of the grip around the handle of the iron.

The temperature of the iron can in this manner be controlled continuously in a desired manner to properly do the work for the different articles under the operator's hand.

Having thus described my invention, I claim:

1. In an electric iron, in combination with the handle thereof and the electric leads with terminals, a switch in the handle for closing the circuit through said terminals, a lever disposed in the said handle and adapted to protrude from the handle with the said switch in contact-breaking position, the said lever being in a position to be reached by the hand operating the iron in the normal manner and adapted to be forced into the handle by a firm grip of the handle and so as to actuate said switch for contact-making purposes, there being cooperative cavities in said lever and a stationary part said handle adapted to become located opposite one another when the lever is in contact-making position, and a locking member resting in inoperative position in one of said cavities and adapted to become wedged when said cavities are opposite one another to lock the lever and thereby the switch in contact-making position in the handle when the iron is placed on end.

2. In an electric iron, in combination with the handle thereof and the electric leads with their terminals, a switch in said handle in operative relation to said terminals, a lever in the handle normally protruding from the handle and adapted to be reached by the hand operating the iron by a firm grip around the handle and adapted to force said switch into contact-making position, there being cooperative cavities in said lever and a stationary part said handle adapted to become located opposite one another when the lever is in contact-making position, and a locking member normally resting in inoperative position in one of said cavities when the iron is being operated or placed with its ironing surface in its normal position on the material to be ironed and adapted to become wedged between the said lever and thereby lock the switch in contact-making position in the handle when the iron is placed on end.

EARLE GERNERT.